United States Patent [19]
Kuribayashi et al.

[11] 4,323,997
[45] Apr. 6, 1982

[54] LINEAR-TRACKING PICK-UP ARM DRIVE ASSEMBLY

[75] Inventors: Hiroshi Kuribayashi; Atsuo Ikeda, both of Tokorozawa, Japan

[73] Assignee: Pioneer Electronic Corporation, Tokyo, Japan

[21] Appl. No.: 192,171

[22] Filed: Sep. 29, 1980

Related U.S. Application Data

[62] Division of Ser. No. 41,403, May 21, 1979, abandoned.

[30] Foreign Application Priority Data

May 23, 1978 [JP] Japan ................................. 53-61228
May 12, 1979 [JP] Japan ................................. 54-58179
May 12, 1979 [JP] Japan ................................. 54-58180

[51] Int. Cl.³ ..................... G11B 19/14; G11B 17/06
[52] U.S. Cl. ..................................... 369/33; 369/41; 369/219
[58] Field of Search ................... 369/33, 41, 219, 220

[56] References Cited

U.S. PATENT DOCUMENTS

| 3,449,833 | 6/1969 | Dzula | 33/125 M |
| 3,530,447 | 9/1970 | Lambert | 369/33 |
| 3,688,410 | 9/1972 | Ziedler et al. | 33/125 M |
| 3,937,903 | 2/1976 | Osann | 369/33 |
| 4,135,086 | 1/1979 | Baba | 369/41 |
| 4,184,688 | 1/1980 | Omura | 369/216 |
| 4,230,323 | 10/1980 | Tsuji et al. | 369/33 |

Primary Examiner—John W. Shepperd
Attorney, Agent, or Firm—Michael J. Striker

[57] ABSTRACT

A linear-tracking pick-up arm drive assembly of an audio or video disc player, wherein the movement of the pick-up arm of the disc player is monitored by a photoelectric, photomagnetic or electrostatic pick-up device for controlling the current or voltage to be supplied to an electrically operated drive unit such as a linear motor or a rotary motor for driving the pick-up arm to move linearly with respect to a recording disc.

5 Claims, 12 Drawing Figures

LINEAR-TRACKING PICK-UP ARM DRIVE ASSEMBLY

This is a division, of application Ser. No. 041,403, filed May 21, 1979, now abandoned.

FIELD OF THE INVENTION

The present invention relates in general to audio or video disc players and, in particular, to a linear-tracking pick-up arm drive assembly for driving the linear-tracking pick-up arm of an audio or video disc player such as, for example, the tone arm of an audio disc player.

BACKGROUND OF THE INVENTION

Among the known linear-tracking pick-up arm drive assemblies of audio or video disc players is an assembly using a linear motor constructed by the combination of a stationary armature and a movable field magnet unit arranged to be longitudinally movable with respect to the stationary amature by the interaction between the constant magnetic field established by the field magnet unit and a variable control field induced by the current supplied to the coil forming part of the stationary armature. The pick-up arm of the audio or video disc player using such a linear motor is supported by the field magnet unit thus arranged and is moved over the surface of a recording disc set in the disc player as the movable field magnet unit is driven to move with respect to the stationary armature.

Another type of known linear-tracking pick-up arm drive assembly of an audio or video disc player uses a rotary motor for driving the pick-up arm by means of a suitable mechanical linkage connected to a movable unit on which the pick-up arm is supported.

In each of these known linear-tracking pick-up arm drive assemblied, the direction and the velocity of the movement of the pick-up arm can be varied by changing the polarity and the intencity of the current to be supplied to the coil forming part of the stationary armature of the linear motor or the coil included in the rotary motor. Difficulties are, however, encountered in enabling the pick-up arm to travel at a constant velocity during playing operation of the disc player and in causing the pick-up arm to stop accurately in a desired or specified position during or at the end of the playing operation.

An object of the present invention is, therefore, to provide an improved linear-tracking pick-up arm assembly which is capable of driving the pick-up arm of an audio or video disc player to move at a constant velocity during operation of the disc player and causing the pick-up arm to stop accurately in a desired or specified position during or at the end of the operation of the disc player.

SUMMARY OF THE INVENTION

In accordance with the present invention, the above described object is accomplished basically in a linear-tracking pick-up arm drive assembly which comprises at least one elongated stationary guide member, a movable unit having a pick-up arm supported thereon and longitudinally movable on and along the guide member, the pick-up arm being movable with the movable unit to and from a predetermined reference position, electrically operated drive means operative to drive the movable unit on and along the guide member, a rotary disc rotatable with the longitudinal movement of the movable unit, position detecting means responsive to the rotational movement of the rotary disc for producing a signal representative of the distance of the pick-up arm moved from the above mentioned reference position thereof, and a control circuit responsive to the signal from the position detecting means. The control circuit in the pick-up arm drive assembly thus constructed and arranged basically may comprise a memory circuit operative to have stored therein a signal which is representative of a predetermined transitive or index position of the pick-up arm from the above mentioned reference position thereof, differential signal generating means connected between the aforesaid memory circuit and the aforesaid position detecting means and operative to produce a differential signal representative of the difference between the signal from the position detecting means and the signal stored in the memory circuit, and a control signal generator for converting the differential signal into a control signal for the drive means.

In the linear-tracking pick-up arm drive assembly thus constructed and arranged, the signal delivered from the position detecting means forming part of the drive assembly may fail to accurately represent the position of the pick-up arm moved from the predetermined reference position of the pick-up arm due, for example, to the failure of the rotary disc in faithfully responding to the longitudinal movement of the movable unit.

To provide a solution to such a problem, the control circuit included in the linear-tracking pick-up arm drive assembly provided by the present invention may further comprise signal correcting means adapted to eliminate an error which may be contained in the signal delivered from the position detecting means or, more specifically, in the differential signal generator preferably provided in the control circuit.

BRIEF DESCRIPTION OF THE DRAWINGS

The features and advantages of a linear-tracking pick-up arm drive assembly according to the present invention will be more clearly appreciated from the following description taken in conjunction with the accompanying drawings in which like reference numerals designate similar or corresponding units, members and elements in some figures and in which.

DESCRIPTION OF THE PREFERRED EMBODIMENTS

Figure 1:
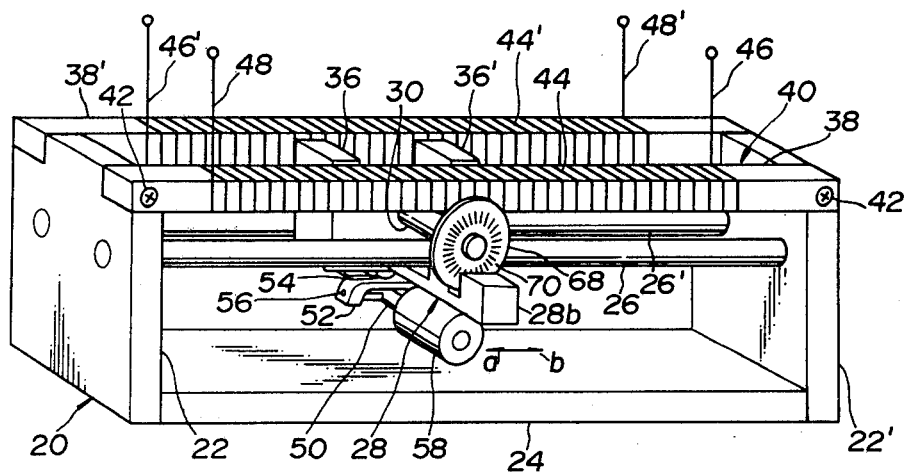
FIG. 1 is a perspective view showing a preferred embodiment of the linear-tracking pick-up arm drive assembly according to the present invention.
Figure 2:
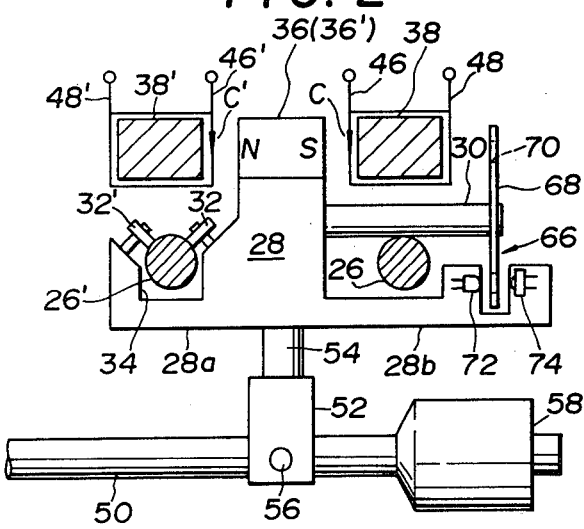
FIG. 2 is a cross sectional view showing, partly in elevation, the embodiment illustrated in FIG. 1.

Referring to the drawings, first particularly to FIGS. 1 and 2 thereof, a linear-tracking pick-up arm drive assembly embodying the present invention comprises a stationary support structure 20 having a pair of spaced parallel, vertical end plates 22 and 22' and a substantially horizontal elongated base plate 24 secured along the longitudinal ends thereof to respective lower end portions of the end plates 22 and 22' by suitable fastening means (not shown). The general construction of the support structure 20 herein shown is merely by way of example and is, for this reason, not limitative of the subject matter of the present invention. The support structure 20 as a whole or at least each of the end plates 22 and 22' thereof is preferably constructed of a non-magnetic material. A pair of elongated guide members 26 and 26' are securely connected each at one axial end to the end plate 22 and at the other axial end to the end plate 22' by suitable fastening means (not shown). The guide members 26 and 26' extend substantially horizontally in longitudinal directions of the support structure 20 and are spaced apart in parallel from each other throughout the lengths thereof. Each of the guide members 26 and 26' is herein assumed to have a circular cross section by way of example but may be otherwise configured in cross section if desired.

A magnet-carrying movable unit 28 is mounted on these guide members 26 and 26' by suitable bearing means and is movable longitudinally on and along the guide members 26 and 36' between the end plates 32 and 32' of the support structure 30. In the arrangement of FIGS. 1 and 2, the bearing means is shown to comprise a cylindrical roller 30 axially projecting from one side wall of the movable unit 28 and having a center axis which is substantially perpendicular, in non-intersecting relationship, to one guide member 26. The cylindrical roller 30 is rotatable about the center axis thereof with respect to the movable unit 28 and rollably bears on the guide member 26. The bearing means supporting the movable unit 28 on the guide members 26 and 26' is shown further comprising two sets of roller bearings 32 and 32' mounted on a lateral extension 28a of the movable unit 28 as shown in FIG. 2. The lateral extension 28a of the movable unit 28 protrudes opposite to the cylindrical roller 30 and is formed with an elongated groove 34 which is open and longitudinally extends along and below the other guide member 26'. The two sets of roller bearings 32 and 32' are in rollable engagement with an upper portion of the guide member 26'. Thus, the movable unit 28 is supported in weight transmitting relationship on the guide members 26 and 26' by means of the bylindrical roller 30 on one side of the movable unit 28 and the roller bearings 32 and 32' on the other side of the movable unit 28. For the purpose to be described later, the movable unit 28 further has a lateral extension 28b protruding opposite to the above mentioned lateral extension 28a.

For the purpose of preventing the movable unit 28 from overshooting when moved on the guide members 26 and 26', the cylindrical roller 30 forming part of the bearing means for the movable unit 28 may be composed of a shaft rotatably mounted on the movable unit 28 and a sleeve rotatably mounted on the shaft and forming a thin, cylindrical gap between the shaft and the sleeve, though not shown in the drawings. The thin cylindrical gap thus formed between the shaft and the sleeve is filled with a suitable viscous fluid such as for example silicon oil so that a viscous drag is created between the shaft and the sleeve when the shaft driven to turn with the movement of the movable unit 28 forces the sleeve to rotate on the shaft through the intermediary of the film of the viscous fluid. The degree of the viscous drag thus produced between the shaft and the sleeve may be properly selected by selecting the viscosity of the fluid to be used.

The magnet-carrying movable unit 28 thus supported and longitudinally movable on the guide members 26 and 26' has fixedly mounted thereon two permanent magnets 36 and 36' projecting upwardly from the movable unit 28. The permanent magnets 36 and 36' on the movable unit 28 are spaced apart substantially in parallel from each other in a longitudinal direction of the support structure 20 and which have respective magnetic axes substantially at right angles to the longitudinal direction of the support structure 20. A pair of elongated core members 38 and 38' each constructed of a magnetic material such as soft iron longitudinally extend substantially in parallel with the guide members 26 and 26' and are fast at their respective longitudinal ends on the upper faces of the end plates 22 and 22' of the support structure 20. The magnetic core members 38 and 38' are spaced apart substantially in parallel from each other in a lateral direction of the support structure 20 and, thus, form therebetween an opening 40 elongated in a longitudinal direction of the support structure 20. The core members 38 and 38' are positioned laterally on both sides of the permanent magnets 36 and 36', which are accordingly movable longitudinally within the elongated opening 40 thus formed between the core members 38 and 38'. Each of the permanent magnets 36 and 36' has its opposite lateral end faces slightly spaced apart substantially equally from the respective inner lateral ends of the core members 38 and 38' and forms an air gap between one lateral end face of each of the magnets 36 and 36' and the inner side end of one of the core members 38 and 38' and an air gap between the other lateral end of each magnet and the inner side end of the other core member. Each of the core members 38 and 38' preferably has a rectangular cross section as shown and, thus, the above mentioned inner side end of each core member is constituted by the flat inner side face of the core member. The permanent magnets 36 and 36' thus arranged with respect to the magnetic core members 38 and 38' are assumed to have south poles at their respective lateral end faces adjacent to the inner side face of the core member 38 and north poles at their respective lateral end faces adjacent to the inner side face of the core member 38', as indicated at S and N in FIG. 2.

The magnetic core members 38 and 38' are secured at their longitudinal ends to the end plates 22 and 22' of the support structure 20 by suitable fastening means such as screws 42 as shown.

A control coil 44 is helically wound on and around the magnetic core member 38 and is connected at the opposite ends thereof to lead wires 46 and 48 and, likewise, a control coil 44' is helically wound on and around the magnetic core member 38' and is connected at the opposite ends thereof to lead wires 46' and 48'. The coils 44 and 44' are wound, for example, in the same directions as will be seen from FIG. 1 and preferably have equal numbers of turns per unit length of the magnetic core members 38 and 38', respectively. The combination of the magnetic core member 38 and the control coil 44 thereon and the combination of the magnetic core member 38' and the control coil 44' thereon respectively constitute stationary linear armatures which are to coact with a field magnet unit constituted by the permanent magnets 36 and 36' on the movable unit 28. The respective lead wires 46 and 46' of the control coils 44 and 44' forming part of these armatures are assumed to be connected to positive terminals and the respective lead wires 48 and 48' of the coils 44 and 44' are assumed to be connected to negative terminals for further connection to a suitable source (not shown) of control current.

In the arrangement herein shown, each of the control coils 44 and 44' is wound on each of the magnetic core members 38 and 38' in a direction in which a current to flow from the positive terminal to the negative terminal flows upwardly in its portions on the inner side face of the magnetic core member as indicated by arrows c and c' in FIG. 2. When, therefore, a voltage is applied between the positive and negative lead wires 46 and 48 connected to the control coil 44, a magnetomotive force directed rightwardly of the core member 38 in the position shown in FIG. 1 is built up in the coil 44 by the interaction between the constant flux field extending from the core member 38 into the south-pole end portion of each of the permanent magnets 36 and 36' through the air gap therebetween and the variable control field induced by the current which transversely cuts across the constant flux field. Similarly, a voltage applied between the positive and negative lead wires 46' and 48' connected to the control coil 44' creates a magnetomotive force directed also leftwardly of the core member 38' in the position shown in FIG. 1 by the interaction between the constant flux field extending from the north-pole end portion of each of the permanent magnets 36 and 36' into the magnetic core member 38' through the air gap therebetween and the variable control field induced by the current which transversely cuts across the constant flux field. The control coils 44 and 44' being fast on the stationary core members 38 and 38', respectively, the magnetomotive forces thus produced in the two stationary armature are reacted upon by the permanent magnets 36 and 36' on the movable unit 38 with the result that the movable unit 28 is caused to move leftwardly on the guide members 26 and 26' in the shown positions as indicated by arrow a in FIG. 1 while carrying the permanent magnets 36 and 36' through the opening 44 between the core members 38 and 38'. If the direction of the current to flow through each of the control coils 44 and 44' is reversed, the direction of the control field built up around each control coil is reversed and as a consequence the movable unit 28 is moved rightwardly on the guide members 26 and 26' as indicated by b in FIG. 1. The control coils 44 and 44' are energized by currents of equal intensities so that substantially equal magnetomotive forces are produced in the coils 44 and 44'. Thus, the movable unit 28 is movable in the opposite directions a and b on the guide members 26 and 26' without tending to skewing with respect to the guide members 26 and 26' if the two stationary linear armatures coacting with the magnets 36 and 36' on the movable unit 28 are constructed similarly to each other.

The magnet-carrying movable unit 28 is connected to a linear-tracking pick-up arm 50 by means of an arm holder 52 which is fitted to a vertical shaft 54 axially projecting downwardly from the bottom wall of the movable unit 28 as clearly shown in FIG. 2. The arm holder 52 is rotatable about the vertical center axis of the shaft 54 and has the pick-up arm 50 pivotally supported on the arm holder by means of a horizontal pivot pin 56 having a center axis perpendicular to an extension of the center axis of the shaft 54. The pick-up arm 50 is, thus, rotatable about the vertical center axis of the shaft 54 projecting downwardly from the movable unit 28 and about the horizontal axis of the pivot pin 56 supporting the pick-up arm 50 on the arm holder 46. As is customary in the art, the pick-up arm 50 has a balancing weight 58 mounted on one end portion of the arm and a stylus cartridge (not shown) mounted on the other end portion of the arm. The stylus cartridge thus mounted on the linear-tracking pick-up arm 50 is and arranged to be movable over a recording disc which is set for rotation about a vertical axis or sidewise of a recording disc which is set for rotation about a horizontal axis.

The pick-up arm 50 thus supported by the magnet-carrying movable unit 28 extends substantially perpendicularly, in non-intersecting relationship, to the directions of the arrows a and b of the movement of the movable unit 28 on the guide members 26 and 26' and is movable with the movable unit 28 and the arm holder 52 in directions substantially parallel with the directions of the arrows a and b of the movement of the movable unit 28. When the control coils 44 and 44' on the magnetic core members 38 and 38' are energized by an electric current supplied thereto through the positive lead wires 46 and 46', respectively, thereof as above described, the pick-up arm 50 is thus driven to linearly move in a direction parallel with the direction of the arrow a or b of the movement of the movable unit 28 between a predetermined rest position having the stylus cartridge located radially outside the recording disc and a predetermined limit position having the stylus cartridge located close to the axis of rotation of the recording disc. The above mentioned rest position and limit position of the pick-up arm 50 are herein assumed to respectively correspond to the opposite limit positions of the movable unit 28 movable in the directions of the arrows a and b on the guide members 26 and 26' of the support structure 20. It is apparent that the movement of the pick-up arm 50 between these positions thereof is effected at a velocity which is continuously variable with the intensity of the current supplied to the control coils 44 and 44'.

While the magnet-carrying movable unit 28 and the linear-tracking pick-up arm 50 in the embodiment of FIGS. 1 and 2 are positioned below the stationary armatures constituted by the core members 38 and 38' and the control coils 44 and 44', the arrangement may be modified so that the magnet-carrying movable unit and the linear-tracking tone arm are positioned above the stationary armatures as in the embodiment illustrated in FIGS. 3 and 4.

Figure 3:
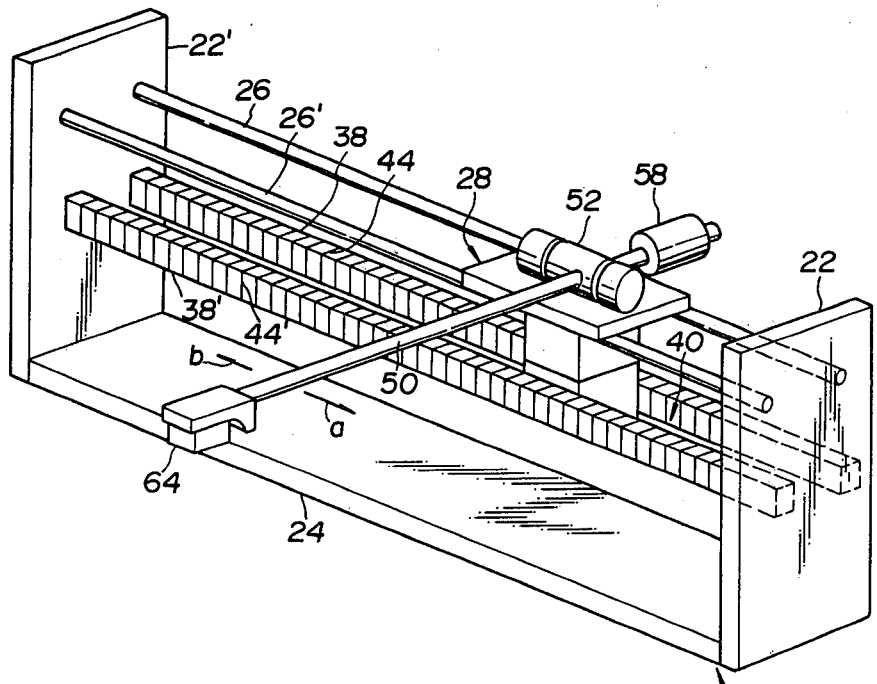
FIG. 3 is a perspective view showing important units, members and elements of another preferred embodiment of the linear-tracking pick-up arm drive assembly according to the present invention.
Figure 4:
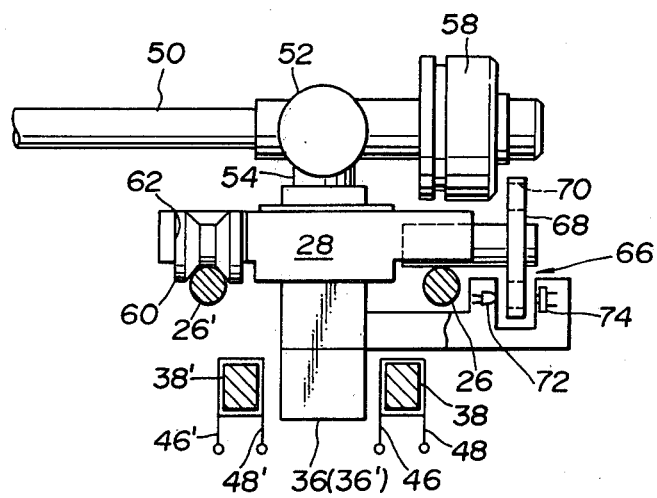
FIG. 4 is a cross sectional view showing, partly in elevation, the embodiment illustrated in FIG. 3.

In the arrangement shown in FIGS. 3 and 4, the elongated guide members 26 and 26' parallel with the magnetic core members 38 and 38' are positioned above the core members 38 and 38', respectively, and the movable unit 28 is positioned and longitudinally movable above the opening 40 formed between the core members 38 and 38'. The permanent magnets 36 and 36' are fixedly mounted on a bottom wall of the movable unit 28 and downwardly projects into the opening 40 between the core members 38 and 38'. The movable unit 28 thus supporting the permanent magnets 36 and 36' is slidably supported on the guide members 26 and 26' by suitable bearing means which is in the shown arrangement assumed to consist of a cylindrical roller 30 axially projecting from one side wall portion of the movable unit 28 and rotatable with respect to the movable unit 28 about its center axis substantially perpendicular, in non-intersecting relationship to one guide roller 26, and grooved rollers 60 mounted on the other side wall portion of the movable unit 28 through openings 62 formed in the side wall portion and each rotatable with respect to the movable unit 28 about an axis perpendicular, in non-intersecting relationship, to the other guide member 26' as will be better seen from FIG. 4. The cylindrical roller 30 rollably rests on the guide member 26 similarly to its counterpart in the embodiment of FIGS. 1 and 2, and likewise the grooved rollers 60 are in rollable engagement with the guide member 26 through the circumferential grooves therein. The movable unit 28 positioned above the opening 40 between the magnetic core members 38 and 38' is supported in weight transmitting relationship to the guide members 26 and 26' by means of the cylindrical roller 30 on one side of the movable unit 28 and the grooved rollers 60 on the other side of the movable unit 28. Similarly to its counterpart in the embodiment of FIGS. 1 and 2, the movable unit 28 in the arrangement shown in FIGS. 3 and 4 has a lateral extension 28b for the purpose to be described later.

The magnet-carrying movable unit 28 in the arrangement of FIGS. 3 and 4 is connected to the linear-tracking pick-up arm 50 by means of an arm holder 52 which is mounted on a vertical shaft 54 axially projecting upwardly from the movable unit 28 and rotatable about its center axis with respect to the movable unit 28. The arm holder 52 is rotatable with respect to the shaft 54 about a horizontal axis perpendicular to the center axis of the shaft 54 so that the pick-up arm 50 is rotatable about the vertical center axis of the shaft 54 and the horizontal axis of rotation of the arm holder 52 on the shaft 54. The pick-up arm 50 thus arranged has a balancing weight 58 mounted on one end portion of the arm and a stylus cartridge 64 as shown. The linear-tracking pick-up arm 50 thus supported by the arm holder 52 on the movable unit 28 in the embodiment illustrated in FIGS. 3 and 4 is driven to move linearly in a direction substantially parallel with the guide members 26 and 26' or, in other words, the direction of the arrow a or b of the movement of the movable unit 28 when the control coils 44 and 44' on the magnetic core members 38 and 38' are energized by an electric current supplied thereto, as in the arrangement illustrated in FIGS. 1 and 2. Similarly to the pick-up arm 50 in the arrangement of FIGS. 1 and 2, furthermore, the linear-tracking pick-up arm 50 in the arrangement shown in FIGS. 3 and 4 is movable between a predetermined rest position corresponding to one limit position of the movable unit 28 and a predetermined limit position corresponding to the other limit position of the movable unit 28.

In each of the embodiments hereinbefore described with reference to FIGS. 1 to 4, the linear motor constructed by the permanent magnets 36 and 36', magnetic core members 38 and 38' and control coils 44 and 44' is of the tupe in which the armatures consisting of the core members 38 and 38' and coils 44 and 44' are held stationary and the field magnet unit composed of the permanent magnets 36 and 36' is movable with respect to the armatures. This is, however, solely by way of example, and, as such, a linear-tracking pick-up arm drive assembly according to the present invention may use a linear motor of the type having one or more stationary field magnet units and a movable armature supporting or otherwise connected to the linear-tracking pick-up arm of an audio or video disc player.

In each of the embodiments hereinbefore described with reference to FIGS. 1 to 4, there is further provided position detecting means for detecting the position of the pick-up arm 50 moved from the rest position thereof. While such position detecting means may be constituted by an elctromagnetic or electrostatic pick-up device, the position detecting means provided in each of the embodiments of the present invention is assumed, by way of example, to be constituted by a photoelectric pick-up device. As shown in each of FIGS. 2 and 4, the photoelectric pick-up device is generally designated by reference numeral 66 and comprises a circular rotary disc 68 secured to the cylindrical roller 30 for rotation about the center axis of the roller 30. The rotary disc 68 is formed with a series of slots or apertures 70 arranged along the outer perimeter of the disc and regularly spaced apart from each other about the axis of rotation of the disc 68. The previously mentioned lateral extension 28a of the movable unit 28 extends below the cylindrical roller 30 and the guide member 26 and has mounted thereon a light emissive element 72 held in position one side of the rotary disc 68 and a light-sensitive photo-electric transducer element 74 is held in position on the other side of the rotary disc 68. The light emissive element 72 and the light-sensitive photoelectric transducer element 74 are aligned with each other across a slotted or apertured outer peripheral portion of the rotary disc 68 and form part of the above mentioned photoelectric pick-up device 66. The light-emissive element 72 is kept energized from an external power power source (not shown) and is operative to emit light toward the light-sensitive photoelectric transducer element 74 when the pick-up drive assembly is in operation. When the movable unit 28 is being moved away from or backwardly toward a certain position thereof and as a consequence the cylindrical roller 30 and accordingly the rotary disc 68 are driven to turn about the center axis of the roller 30, the light emanating from the light-emissive element 72 is alternately intercepted by the rotary disc 68 and passed through one of the slots or aperture 70 in the disc 68 and intermittently irradiates the light-sensitive photoelectric transducer element 74. The light-sensitive photoelectric transducer element 74 thus supplied with a succession of light beams from the light-emissive element 72 through the slots or apertures 70 in the rotating rotary disc 68 is actuated to produce a train of pulses which are equal in number and time interval to the beams of light incident on the transducer element 74. The number of the beams of light passed through the slots or apertures 70 in the rotary disc 68 rotated about the axis of the roller 30 as the movable unit 28 is moved from one limit position thereof varies in direct proportion to the distance of movement of the movable unit 28 from the particular position of the unit. The number of the pulses delivered from the light-sensitive photoelectric transducer element 74 is, thus, representative of the position of the pick-up arm 50 moved from a suitable reference position such as, for example, the previously mentioned rest position of pick-up arm 50. The light-emissive element 72 and the light-sensitive photoelectric transducer element 74 may be constituted by a light-emissive semiconductor diode and a phototransistor, respectively.

Figure 5:
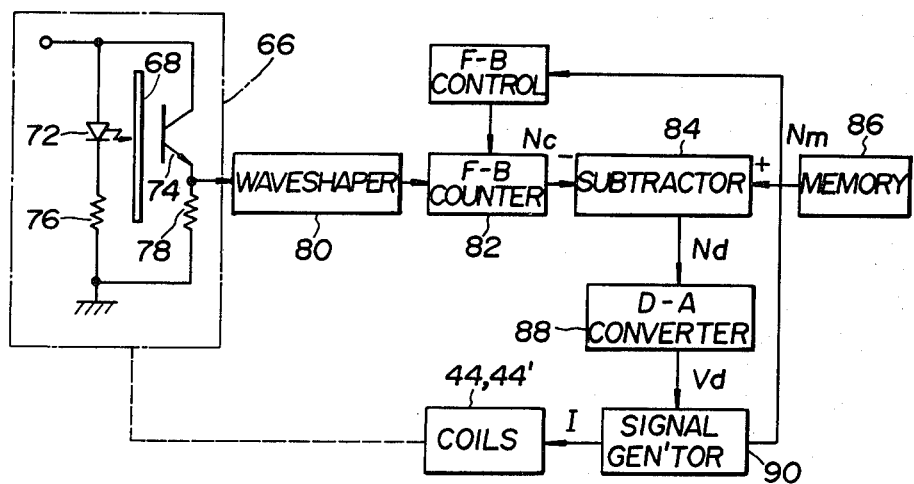
FIG. 5 is a block diagram showing a preferred example of an electric control circuit for use in the embodiment illustrated in FIGS. 1 and 2 or the embodiment illustrated in FIGS. 3 and 4.
Figure 6:
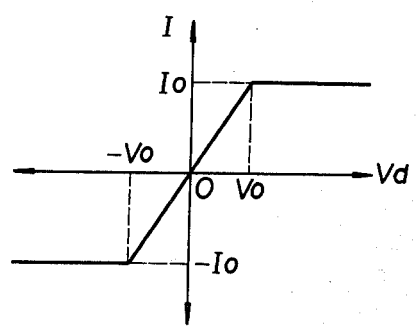
FIG. 6 is a graph showing the relationship between the input and output signals of a signal generator included in the control circuit shown in FIG. 5.

FIG. 5 shows an electric control circuit for energizing the control coils 44 and 44' of the armatures in the embodiment of FIGS. 1 and 2 or FIGS. 3 and 4 in accordance with the pulses thus delivered from the photoelectric pick-up device 66. In FIG. 5, the light-emissive element 72 and the light-sensitive photoelectric transducer element 74 forming paet of the photoelectric pick-up device 66 are assumed to be constituted by a light-emissive semiconductor diode and a phototransistor, respectively, as above noted and are shown to be connected in parallel across a suitable d.c. power source (not shown) through resistors 76 and 78, respectively. The phototransistor 74 has its emitter electrode connected to the input terminal of a waveshaper 80 for shaping each of the output pulses from the photoelectric pick-up device 66 into a pulse having a rectangular waveform with a predetermined width and a predetermined amplitude. The output terminal of the waveshaper 80 is connected to the input terminal of a presettable forward-backward or reversible counter 82 adapted to count the input pulses forwardly or backwardly from a preset starting value. The forward-backward counter 82 has an output terminal connected to one input terminal of a two-input substractor 84 for supplying to the subtractor 84 a digital signal Nc representative of the number of the pulses counted from a preset starting value in the forward-backward counter 82. A memory circuit 86 adapted to register therein the distance of the pick-up arm 50 (FIG. 2 or 4) from a predetermined reference position of the arm is connected to the other input terminal of the subtractor 80 and delivers to the subtractor 84 a digital signal Nm representative of such a distance. The reference position of the pick-up arm as used in the memory circuit 86 is herein assumed, by way of example, to be the previously mentioned rest position of the pick-up arm. The subtractor 84 thus supplied with the digital signal Nc as a subtrahend signal from the forward-backward counter 82 and the digital signal Nc as a minuend signal from the memory circuit 86 produces at its output terminal a digital signal Nd representative of the difference Nm-Nc and delivers the digital signal Nd to a digital-to-analog converter 88 for converting the digital signal Nd into a corresponding analog signal Vd which may be a voltage variable with the digital signal Nd. The analog signal Vd thus produced in the digital-to-analog converter 88 is fed to a control signal generator 90. THe control signal generator 90 is adapted to produce an output signal I which has a fixed absolute value Io when the input signal Vd is higher in absolute value than a predetermined value Vo and which varies in direct proportion to the input signal Vd when the input signal Vd is lower in absolute value than the predetermined value Vo as shown in the graph of FIG. 6. The polarity of the output signal I is coincident with the polarity of the input signal Vd. When the input signal Vd is in the form of voltage, the output signal I may be in the form of current and is, in this instance, supplied direct to the control couls 44 and 44' of the armatures in the pick-up drive assembly shown in FIGS. 1 and 2 or FIGS. 3 and 4. The signal generator 90 having the above described function may be constituted by a differential amplifier which is well known per se. The forward-backward counter 82 is shifted between a forward counting condition and a backward counting condition under the control of a forward-backward control circuit 92 connected to a control terminal of the counter 82. In the arrangement shown in FIG. 5, the forward-backward control circuit 92 is assumed to be electrically connected to the above described control signal generator 90 for being responsive to the polarity of the output signal I from the signal generator 90. The forward-backward control circuit 92 is, thus, operative to establish in the forward-backward counter 90 the forward counting condition in response to the positive polarity of the output signal I from the control signal generator 90 and the backward counting condition in response to the negative polarity of the output signal I from the signal generator 90.

The operation of the control circuit thus constructed and arranged will be hereinafter described with reference to FIGS. 1 to 6.

When the pick-up arm 50 (FIG. 2 or 4) of the audio or video disc player is held in the rest position thereof, the digital signal Nc appearing at the output signal of the presettable forward-backward counter 82 represents the value preset in the counter. If, in this instance, the preset value in the forward-backward counter 82 is zero, the output signal Nc from the counter is maintained at a zero level.

When, under these conditions, the control coils 44 and 44' in the pick-up arm drive assembly shown in FIGS. 1 and 2 or FIGS. 3 and 4 are energized and as a consequence the movable unit 28 is moved from one of the limit positions thereof, the rotary disc 68 on the roller 30 rotating with the movement of the movable unit 28 is driven to turn about the axis of rotation of the roller 30 so that the phototransistor 74 of the photoelectric pick-up device 66 delivers to the waveshaper 80 and through the waveshaper 80 to the forward-backward counter 82 a succession of pulses which gradually increase in number as the pick-up arm 50 is moved away from the rest position thereof. The forward-backward counter 82 thus produces at its output terminal a digital signal Nc representative of the distance of the pick-up arm 50 moved from the rest position thereof. The digital signal Nc is fed as a subtrahend signal to one input terminal of the subtractor 84. By the point of time when the pick-up arm 50 is initiated into motion to move from the rest position thereof, the memory circuit 86 has registered therein the distance between the rest position of the pick-up arm 50 and a predetermined transitive position of the pick-up arm 50 with respect to the recording disc (not shown) set in the disc player and supplies as a minuend signal a digital signal Nm representative of the distance between the two different positions of the pick-up arm 50. When the pick-up arm 50 is in the rest position thereof, the digital signal Nc produced by the presettable forward-backward counter 82 which is preset to a zero value is maintained at a zero level as previously described so that the digital signal Nd delivered from the subtractor 84 is equal to the digital signal Nm supplied from the memory circuit 86 to the subtractor 84. Under these conditions, the analog signal Vd produced by the digital-to-analog converter 88 is higher than the predetermined value Vo with the result that the control signal generator 90 delivers an output signal I of the predetermined value Io as will be understood from the graph of FIG. 6. The control coils 44 and 44' of the armatures in the pick-up arm drive assembly are therefore energized by a constant current corresponding to the predetermined value Io of the output signal I being thus delivered from the control signal generator 90 so that the pick-up arm 50 is moved at a constant velocity from the rest position thereof. The output signal I from the control signal generator 90 being positive in polarity, the forward-backward control circuit 92 establishes the forward counting condition in the forward-backward counter 82.

As the pick-up arm 50 being moved away from the rest position thereof approaches the above mentioned transitive position thereof, the digital signal Nc supplied from the forward-backward counter 82 becomes closer to the digital signal Nm supplied from the memory circuit 86 so that the analog signal Vd appearing at the output terminal of the digital-to-analog converter 88 decreases toward the zero level. Until the output signal Nd from the subtractor 84 reaches a value corresponding to the predetermined value Vo of the analog output signal Vd from the digital-to-analog converter 88, the output signal I from the control signal generator 90 is maintained at the predetermined value Io so that when the pick-up arm 50 is driven to move at a constant velocity toward the predetermined transitive position thereof. After the pick-up arm 50 is moved beyond a certain position ahead of the predetermined transitive position thereof, the digital output signal Nd from the subtractor 84 becomes smaller than the value corresponding to the predetermined value Vo of the analog output signal Vd from the digital-to-analog converter 88. The control signal I delivered from the control signal generator 90 now decreases with the decrease in the analog output signal Vd from the digital-to-analog converter 88 and causes the pick-up arm 50 to move toward the reference or target position thereof at a velocity which continuously decreases as the pick-up arm 50 is moved closer to the transitive position. At the point of time when the digital signal Nc supplied from the forward backward counter 82 is equalized with the digital signal Nm supplied from the memory circuit 86, the analog output signal Vd from the digital-to-analog converter 88 and accordingly the output signal I from the control signal generator 90 are reduced to the zero levels with the result that the control coils 44 and 44' of the pick-up arm drive assembly are de-energized and as a consequence the pick-up arm 50 is brought to a stop in the transitive position thereof.

If it happens that the pick-up arm 50 is moved beyond the predetermined transitive position thereof for some reason, the digital signal Nc supplied form the forward-backward counter 82 becomes larger than the digital signal Nm supplied from the memory circuit 86 so that the analog output signal Vd from the digital-to-analog converter 88 and accordingly the output signal I from the control signal generator 90 have the negative polarities. The forward-backward control circuit 92 then makes a shift from the forward counting condition to the backward counting condition in the foward-backward counter 82. The forward-backward counter 82 is now made operative to backwardly count the pulses fed thereto so that the digital signal Nc which has once increased beyond the digital signal Nm from the memory circuit 86 is reduced toward the latter and as a consequence the output signal I from the control signal generator 90 increases toward the zero level. On the other hand, the reversal of the polarity of the output signal I from the control signal generator 90 results in a reversal of the direction of movement of the pick-up arm 50. Thus, the pick-up arm 50 is moved backwardly toward the reference or target position thereof while the output signal I from the control signal generator 90 is increasing toward the zero level. When the control signal I reaches the zero level, the supply of the current to the control coils 44 and 44' is interrupted so that the pick-up arm 50 is brought to a full stop correctly in the reference or target position thereof. The reference or target position in which the pick-up arm 50 is to be brought to a stop may be a position in which the pick-up arm 50 has the stylus cartridge located at the outer peripheral edge of the recording disc and is ready to start the playing operation.

Figure 7:
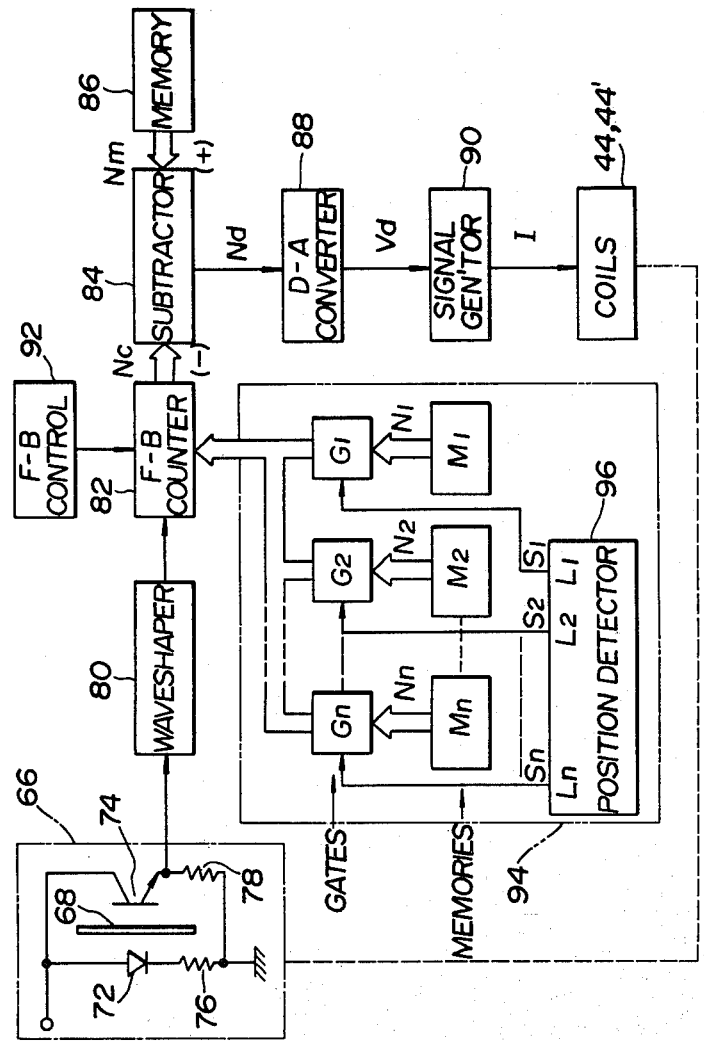
FIG. 7 is a block diagram showing a modification of the control circuit illustrated in FIG. 5.

In the arrangement illustrated in FIGS. 1 and 2 or FIGS. 3 and 4, it may happen that the number of the pulses counted by the forward-backward counter 82 by the point of time at which the pick-up arm 50 is moved to the predetermined transitive position thereof fails to coincide with the number of the pulses represented by the digital signal Nm supplied from the memory circuit 86. Such as accident may be caused by a failure in the operation of the forward-backward counter 82 or when the roller 30 carrying the rotary disc 68 happens to slip on the guide member 26. FIG. 7 shows a control circuit provided with signal correcting means adapted to correct an error in the digital signal Nc to be delivered from the forward-backward counter 82 in the control circuit of FIG. 5.

Referring to FIG. 7, the signal correcting means, generally designated by reference numeral 94, comprises a position detector 96 adapted to monitor an n number of predetermined transitive positions $L_1$, $L_2$, ... $L_n$ of the pick-up arm 50 with respect to, for example, the recording disc (not shown) set in the disc player and to produce output signals $S_1$, $S_2$, ... $S_n$ representative of the detected transitive positions $L_1$, $L_2$, ... $L_n$, respectively, of the pick-up arm 50. The position detector 96 may be constituted by a suitable photoelectric, electrostatic or electromagnetic position detector responsive to the movement of the pick-up arm 50. The signals $S_1$, $S_2$, ... $S_n$ thus delivered successively from the position detector 96 as the pick-up arm 50 is moved from the rest position thereof are fed to the trigger terminals of gate circuits $G_1$, $G_2$, ... $G_n$, respectively, having input terminals connected to the output terminals of memory circuits $M_1$, $M_2$, ... $M_n$, respectively. The memory circuits $M_1$, $M_2$, ... $M_n$ are adapted to register therein the distances of the pick-up arm 50 in the above mentioned transitive positions $L_1$, $L_2$, ... $L_n$ from the predetermined reference position, viz., the rest position of the pick-up arm 50 and to deliver digital output signals $N_1$, $N_2$, ... $N_n$ representative of such distances to the input terminals of the gate circuits $G_1$, $G_2$, ... $G_n$, respectively. The gate circuits $G_1$, $G_2$, ... $G_n$ have respective output terminals jointly connected to the presetting terminal of the presettable forward-backward counter 82 so that the digital signals $N_1$, $N_2$, ... $N_n$ appearing at the respective output terminals of the memory circuits $M_1, M_2, \ldots Mn$ are passed through the gate circuits $G_1, G_2, \ldots Gn$ to the presetting terminal of the forward-backward counter 82 every time the gate circuits $G_1, G_2, \ldots Gn$ are triggered by the signals $S_1, S_2, \ldots Sn$ which are delivered in succession from the arm position detector 96. When the forward-backward counter 82 is supplied at its presetting terminal with the digital signal passed through, for example, the gate circuit $G_1$, the digital signal Nc which has been accummulated in the counter 82 is cleared and substituted by the digital signal $N_1$ supplied from the memory circuit $M_1$. In this fashion, the presettable forward-backward counter 82 is preset by the digital signals $N_1, N_2, \ldots Nn$ supplied from the memory circuits $M_1, M_2, \ldots Mn$ through the gate circuits $G_1, G_2, \ldots Gn$ every time the pick-up arm 50 being moved away from the rest position thereof reaches the predetermined transitive positions $L_1, L_2, \ldots Ln$. If the number of the pulses delivered from the photoelectric pick-up device 66 and counted by the forward-backward counter 82 fails to correctly represent the distance of movement of the pick-up arm 50 from the rest position or any other suitable reference position thereof, the digital signal Nc delivered from the counter 82 is corrected by each of the digital signals $N_1, N_2, \ldots Nn$ in the course of operation of the disc player.

The accuracy of the digital signal Nc delivered from the forward-backward counter 82 will be enhanced the more as the frequency with which the digital signals Nc is corrected during each operation of the disc player. In view, however, of the fact that the error which may be produced in the digital signal Nc produced by the forward-backward counter 82 per se during each stroke of the pick-up arm 50 moved from the rest position to the end position (at the end of one playing operation of the player) and backwardly from the end position to the initial rest position is usually negligible, the correction of the signal Nc delivered from the forward-backward counter 82 may be effected only once during one stroke of the pick-up arm 50, for example, at the end of the stroke of the pick-up arm 50. When the correction of the signal Nc is made at the end of each stroke of the pick-up arm 50, the number of the pulses represented by the signal Nc appearing at the output terminal of the forward-backward counter 82 should be zero at the end of the stroke of the pick-up arm 50. If the correction of the digital signal Nc is to be corrected at the end of each stroke of the pick-up arm 50, the signal correcting means which has been assumed to be composed of the position detector 96, memory circuits $M_1, M_2, \ldots Mn$ and gate circuits $G_1, G_2, \ldots Gn$ may therefore be constituted simply by an electric circuit which is operative to reset or clear the forward-backward counter 82 at the end of a stroke of the pick-up arm 50.

Figure 8:
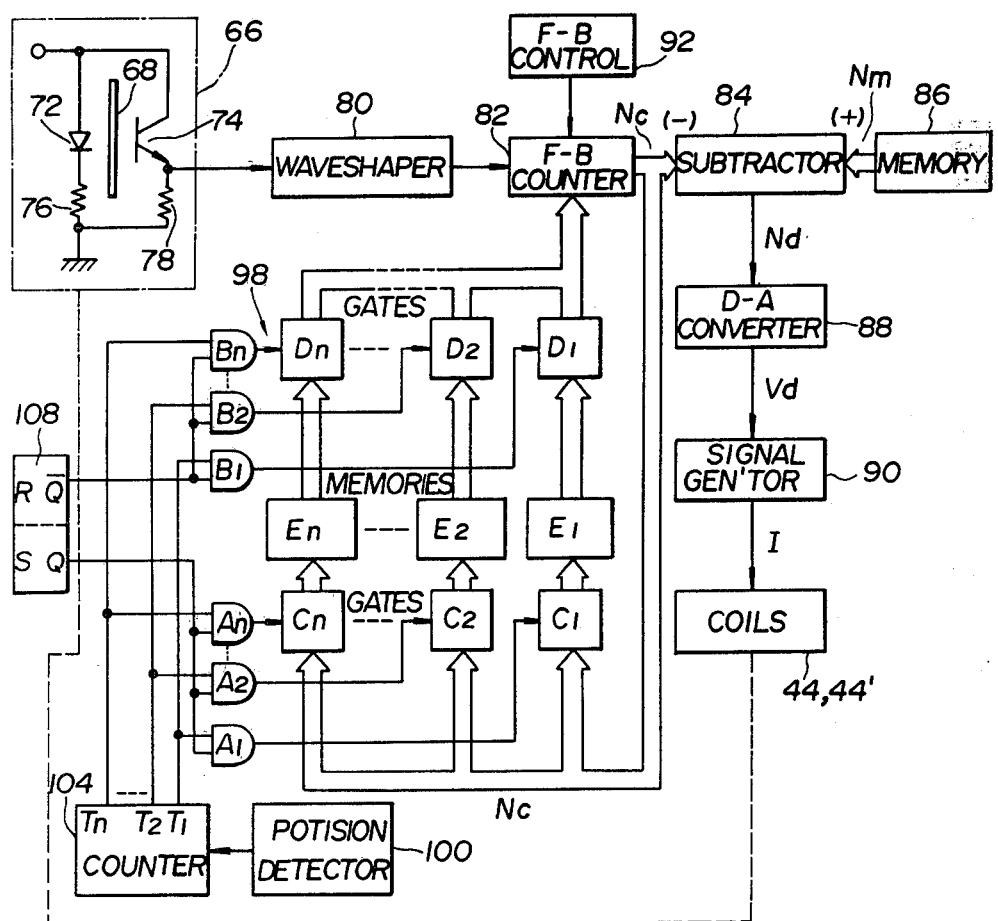
FIG. 8 is a block diagram showing another modification of the control circuit illustrated in FIG. 5.

FIG. 8 shows a control circuit provided with another form of signal correcting means added to the control circuit illustrated in FIG. 5.

Figure 9:
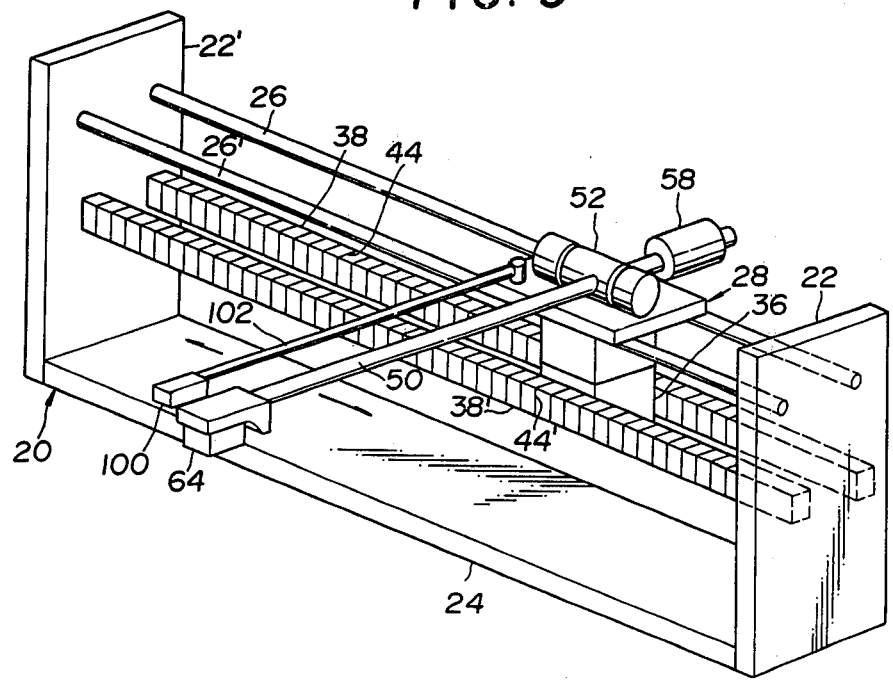
FIG. 9 is a perspective view similar to FIG. 3 but shows a linear-tracking pick-up arm drive assembly provided with a position detector which forms part of the control circuit illustrated in FIG. 8.

Referring to FIG. 8, the signal correcting means, generally designated by reference numeral 98, comprises position detector 100 which is adapted to detect the intermissions between the pieces of music or other information recorded on a recording disc (not shown) set on the audio or video disc player. Though not shown in the drawings, the position detector 100 is constituted by the combination of a light-emissive element and a light-sensitive photoelectric transducer element and is responsive to the difference between the coefficient of reflection at a grooved playing zone and the coefficient of reflection at a plain intermission zone of an audio or video recording disc. The position detector 100 thus constructed is mounted on a suitable carrier member movable with the pick-up arm of the audio or video disc player and arranged as shown, by way of example, in FIG. 9 wherein a linear-tracking pick-up arm drive assembly is shown to be constructed similarly to the assembly illustrated in FIGS. 3 and 4. As shown in FIG. 9, the position detector 100 is mounted on an elongated carrier bar 102 which is cantilevered at one end to the magnet-carrying movable unit 28 supporting the arm holder 52 and which carries the position detector 100 at the other end thereof. The light-emissive element forming part of the position detector 100 is arranged to be capable of emitting a beam of light toward the surface of a recording disc to be set in the disc player while the light-sensitive photoelectric transducer element of the position detector 100 is arranged so that the beam of light reflected at the surface of the disc is incident on the transducer element. When, thus, the pick-up arm 50 is driven to move over the surface of the recording disc, the position detector 100 travels over the grooved playing zones and the plain intermission zones of the recording disc. The grooved playing and plain intermission zones of a recording player being arranged alternately to each other, the light derected from the light-emissive element of the position detector 100 is reflected at substantially two different reflection coefficients which take effect alternately to each other so that the light-sensitive photoelectric transducer element of the position detector 100 produces a step voltage or a pulse each time the position detector 100 crosses the boundary between a grooved playing zone and one of the two plain intermission zones adjacent to the grooved playing zone. A train of pulses is thus produced by the position detector 100 as the pick-up arm 50 travels between the two limit positions over the recording disc. The coefficient of reflection at a plain intermission zone of a recording disc being higher than the coefficient of reflection at a grooved playing zone of the disc, each of the pulses thus produced by the position detector 100 has a rise time at an end of the intermission zones of the recording disc and is indicative of a definite transitive position of the pick-up arm 50 with respect to each of the intermission zones of the disc in use.

Turning back to FIG. 8, the pulses delivered from the position detector 100 are fed to a binary counter 104 adapted to count the pulses from the position detector 100 and to produce output signals $T_1, T_2, \ldots Tn$ respectively representative of the intermissions between the pieces of music or other information recorded on the recording disc set in the audio or video disc player. These signals $T_1, T_2, \ldots Tn$ are fed to respective first input terminals of a first set of two-input logic AND-gate circuits $A_1, A_2, \ldots An$ and a second set of two-input logic AND-gate circuits $B_1, B_2, \ldots Bn$. The first set AND-gate cirsuits $A_1, A_2, \ldots An$ have respective second input terminals jointly connected to the uninverted output terminal Q of a flip-flop circuit 108 while the second set AND-gate circuits $B_1, B_2, \ldots Bn$ have respective second input terminals jointly connected to the inverted output terminald $\bar{Q}$ of the flip-flop circuit 106. The flip-flop circuit 106 is adapted to produce a logic "1" signal at the uninverted output terminal Q and a logic "0" signal at the inverted output terminal $\bar{Q}$ when triggered at its set input terminal S and the logic "0" signal at the uninverted output terminal Q and the logic "1" signal at the inverted output terminal $\bar{Q}$ when triggered at its reset input terminal R. As will be described in more detail, the flip-flop circuit 106 is triggered at the set input terminal S by a "lead-in" signal produced when the disc player is to lead in a playing operation with a recording disc set in the player and is triggered at the reset input terminal R by a "repeat" signal produced when the playing operation with the same recording disc is to be repeated. The first set AND-gate circuits $A_1$, $A_2$, ... $A_n$ have respective output terminals connected to the trigger terminals of a first set of signal gate circuits $C_1$, $C_2$, ... $C_n$, respectively, while the second set AND-gate circuits $B_1$, $B_2$, ... $B_n$ have respective output terminals connected to the trigger terminals of a second set of signal gate circuits $D_1$, $D_2$, ... $D_n$, respectively. The first set signal gate circuits $C_1$, $C_2$, ... $C_n$ have respective input terminals jointly connected to the output terminal of the previously described presettable forward-backward counter 82 and respective output terminals connected to the input terminals of memory circuits $E_1$, $E_2$, ... $E_n$, respectively. On the other hand, the second set signal gate circuits $D_1$, $D_2$, ... $D_n$ have respective input terminals connected to the output terminals of the memory circuits $E_1$, $E_2$, ... $E_n$, respectively, and respective output terminals jointly connected to the presetting terminal of the forward-backward counter 82.

At the beginning of a playing operation with a recording disc set in the disc player, a "lead-in" signal is fed to the set input terminal S of the flip-flop circuit 106, which is therefore actuated to produce the logic "1" signal at the uninverted output terminal Q and the logic "0" signal at the inverted output terminal $\bar{Q}$. Thus, each of the first set of AND-gate circuits $A_1$, $A_2$, ... $A_n$ is supplied with the logic "1" signal at its second input terminal and each of the second set of AND-gate circuits $B_1$, $B_2$, ... $B_n$ is supplied with the logic "0" signal at its second input terminal. As the playing operation with the recording disc proceeds and the pick-up arm is moved toward the axis of rotation of the rotating recording disc, the position detector 100 travelling together with the pick-up arm over the surface of the recording disc delivers a train of pulses to the binary counter 104, which is therefore made operative to successively deliver the signals $T_1$, $T_2$, ... $T_n$ to the respective first input terminals of the first set of AND-gate circuits $A_1$, $A_2$, ... $A_n$, respectively, and to the respective first input terminals of the second set of AND-gate circuits $B_1$, $B_2$, ... $B_n$, respectively. As the signals $T_1$, $T_2$, ... $T_n$ are thus delivered in succession from the binary counter 104, the first set AND-gate circuits $A_1$, $A_2$, ... $A_n$ are brought into conduction states from one another in the presence of the logic "1" signal at each of the second input terminals thereof and triggers the first set signal gate circuits $C_1$, $C_2$, ... $C_n$. When the signal gate circuit $C_1$, for example, is triggered to open at a certain point of time, the digital signal Nc appearing at the output terminal of the presettable forward-backward counter 82 at the particular point of time is passed through the signal gate circuit $C_1$ to the associated memory circuit $E_1$ and is stored in the memory circuit $E_1$. By the time when the playing operation with the recording disc is completed, the digital signals Nc delivered from the forward-backward counter 82 at different points of time corresponding to predetermined transitive positions of the pick-up arm with respect to the intermission zones of the recording disc are in this fashion passed in succession through all or some of the first set of signal gate circuits $C_1$, $C_2$, ... $C_n$ and are registered in the associated ones of the memory circuits $E_1$, $E_2$, ... $E_n$, respectively. Throughout the recording operation, all the second set AND-gate circuits $B_1$, $B_2$, ... $B_n$ are maintained in the non-conducting states in the absence of logic "1" signals at the respective second input terminals thereof so that all the second set signal gate circuits $D_1$, $D_2$, ... $D_n$ are held closed.

When it is desired to repeat the playing operation with the same recording disc, a "repeat" signal is fed to the reset input terminal R of the flip-flop circuit 106 and causes the flip-flop circuit 106 to produce the logic "0" signal at the uninverted output terminal Q and the logic "1" signal at the inverted output terminal $\bar{Q}$ thereof. As the repeated playing operation proceeds and the pick-up arm is moved for a second time toward the axis of rotation of the rotating recording disc, the position detector 100 delivers a train of pulses to the binary counter 104 and enables the counter 104 to successively produce the output signals $T_1$, $T_2$, ... $T_n$ as in the case of the first playing operation. The signals $T_1$, $T_2$, ... $T_n$ are fed in succession to the respective first input terminals of the second set AND-gate circuits $B_1$, $B_2$, ... $B_n$, respectively, which are accordingly rendered into the conducting states from one another in the presence of the logic "1" signal at the second input terminal of each of the AND-gate circuits $B_1$, $B_2$, ... $B_n$. The signals $T_1$, $T_2$, ... $T_n$ supplied from the binary counter 104 are also fed to the respective first input terminals of the first set AND-gate circuits $A_1$, $A_2$, ... $A_n$, respectively, which are, however, maintained in the non-conducting states in the presence of the logic "0" signal at the second input terminal of each of the AND-gate circuits $A_1$, $A_2$, ... $A_n$. The result is that the first set signal gate circuits $C_1$, $C_2$, ... $C_n$ are maintained in the closed conditions. The second set AND-gate circuits $B_1$, $B_2$, ... $B_n$ being rendered conductive, the second set signal gate circuits $D_1$, $D_2$, ... $D_n$ are triggered to open so that the digital signals Nc which have been stored in the individual memory circuits $E_1$, $E_2$, ... $E_n$ are allowed to pass in succession through the respectively associated second signal gate circuits $D_1$, $D_2$, ... $D_n$ to the presetting terminal of the forward-backward counter 82. At the points of time when the digital signals Nc are thus fed to the presetting terminal of the forward-backward counter 82 from the individual memory circuits $E_1$, $E_2$, ... $E_n$, the digital signals Nc which are being delivered from the forward-backward counter 82 at the particular points of time are cleared and are respectively substituted by the digital signals Nc released from the memory circuits $E_1$, $E_2$, ... $E_n$. The presettable forward-backward counter 82 is thus preset during the second playing operation of the disc player by the signals Nc which were produced by the counter 82 and stored in the memory circuits $E_1$, $E_2$, ... $E_n$ during the first playing operation of the disc player. The digital signal Nc to be delivered from the forward-backward counter 82 is in this fashion corrected during the second playing operation of the disc player in accordance with the digital signals Nc produced by the forward-backward counter in the course of the first playing operation during which the signal Nc produced by the forward-backward counter 82 tends to contain an error far less than an error which may be produced in the signal Nc produced during the repeated playing operation of the disc player.

Figure 10:
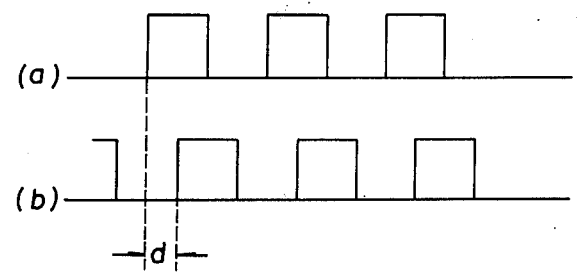
FIG. 10 is a graph showing the waveforms of pulse trains on the basis of which a presettable forward-backward counter included in each of the control circuits shown in FIGS. 5, 7 and 8 may be controlled for forward or backward counting actions.

While a few preferred embodiments of the linear-tracking pick-up arm drive assembly according to the present invention have hereinbefore been described with reference to the drawings, it should be borne in mind that these embodiments are not limitative of the present invention and may therefore be changed and/or modified in numerous manners if desired. For example, the forward-backward control circuit 92 included in each of the circuit arrangements illustrated in FIGS. 5, 7 and 8 may be replaced with a photoelectric pick-up device which is constructed essentially similarly to the photoelectric pick-up device 66 mounted on the magnet-carrying movable unit 28 in the arrangement shown in FIGS. 1 and 2 or FIGS. 3 and 4. In this instance, the photoelectric pick-up device serving as the forward-backward control means is arranged so that the slots or apertures in the rotary disc thereof are angularly out of phase with the slots or apertures 70 in the rotary disc 68 of the position detecting photoelectric pick-up device 66 so that the pulses delivered from the forward-backward control pick-up device as indicated by the waveform in graph (a) of FIG. 10 deviate in phase appropriately from the pulses delivered from the position detecting pick-up device 66 as indicated by the waveform in graph (b) of FIG. 10. In the graph of FIG. 10, it is assumed by way of example that such a phase diviation, indicated by d, is equal to one half of each of the intervals between the slots or apertures in the rotary disc 68 of the photoelectric pick-up device 66. It is apparent that the rotary disc forming part of the forward-backward control pick-up device of the above described nature may be constituted by the rotary disc of the position detecting pick-up device 66.

Figure 11:
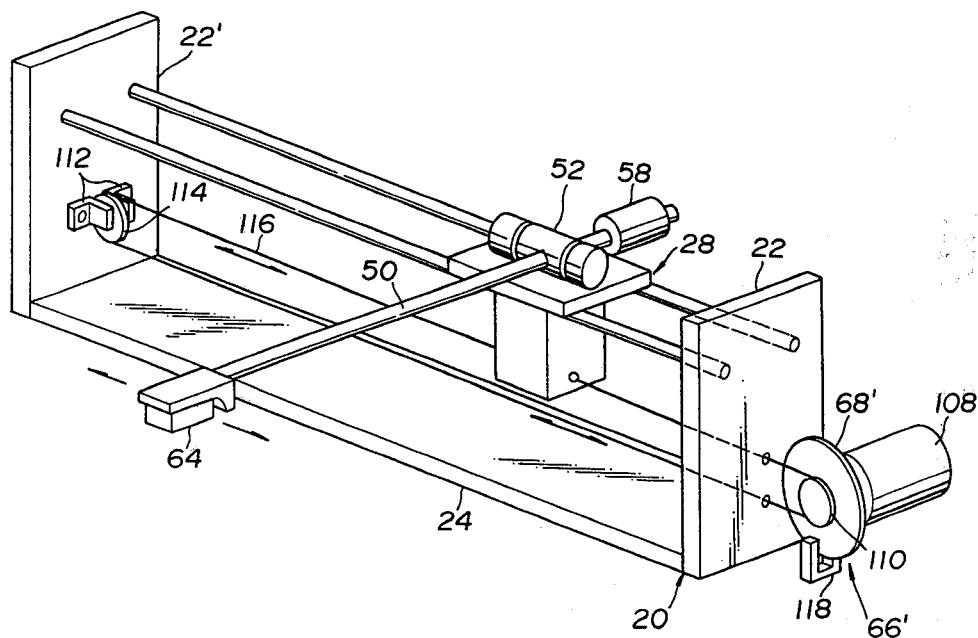
FIG. 11 is a perspective view showing still another preferred embodiment of the linear-tracking pick-up arm drive assembly according to the present invention.

While, furthermore, each of the embodiments of the present invention has been hereinbefore described to use a linear motor as a driving source, the linear-tracking pick-up arm drive assembly according to the present invention may use an ordinary rotary motor. FIG. 11 shows an embodiment of such a drive assembly.

Referring to FIG. 11, the rotary motor, designated by reference numeral 108, is positioned outside one of the end plates 22 and 22' of the support structure 20 in such a manner as to have its output shaft directed substantially perpendicularly, in non-intersecting relationship, to the directions of movement of the movable unit 28 which is arranged to be longitudinally slidable on the parallel guide members 26 and 26'. The output shaft of the rotary motor 108 thus positioned with respect to the support structure 20 has securely mounted thereon a circumferentially grooved driving pulley 110 which is rotatable with the output shaft of the motor about the center axis of the shaft. On the inner face of the other of the end plates 22 and 22' of the support structure 20 is fixedly mounted brackets 112 having supported thereon a circumferentially grooved driven pulley 114 which is rotatable about an axis substantially parallel with the axis of rotation of the driving pulley 110 on the output shaft of the motor 108. A suitable flexible line such as, for example, a wire 116 is passed between the driving and driven pulleys 110 and 112 through holes formed in the end plate 22 adjacent which the motor 108 is positioned. The wire 116 is anchored at one end wall of the movable unit 28 and at the other end to the other end wall of the movable unit 28 so that the movable unit 28 is driven to longitudinally move in one direction on the guide members 26 and 26' when the motor 108 is energized with an electric current with one polarity and to longitudinally move in the other direction on the guide members 26 and 26' when the motor 108 is energized with an electric current with the opposite polarity. In the arrangement shown in FIG. 11, the rotary disc 68 forming part of the photoelectric pick-up device 66 provided in each of the arrangements shown in FIGS. 1 to 4 may be mounted on the output shaft of the motor 108 as indicated by 68' in FIG. 11 with the light-emissive and photoelectric transducer elements (not shown) spaced apart from each other across a slotted or apertured outer peripheral edge portion of the rotary disc 68'. While the light-sensitive and photoelectric transducer elements thus positioned on both sides of the rotary disc 68' in the arrangement of FIG. 11 are mounted on a stationary bracket member 118 and are thus assumed to be fixedly held in position with respect to the support structure 20, they may be mounted on a suitable support member (not shown) arranged to be rotatable about the axis of rotation of the rotary disc 68' in a direction opposite to the direction of rotation of the rotary disc 68', viz., the direction of rotation of the output shaft of the motor 108. This arrangement of the light-emissive and photoelectric transducer elements contributes to increasing the number of pulses to be produced per unit distance of the movement of the pick-up arm and accordingly to enhancement of the accuracy of operation of the control circuit using such pulses. Such an arrangement may be applied also to the photoelectric pick-up device 66 incorporated in the embodiment of FIGS. 1 and 2 or FIGS. 3 and 4, as will be readily understood.

Figure 12:
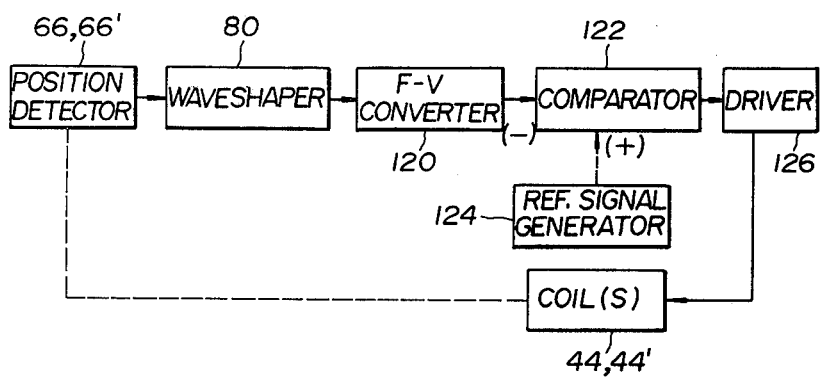
FIG. 12 is a block diagram showing a preferred example of the control circuit for the linear-tracking pick-up arm drive assembly proposed by the present invention.

FIG. 12 shows an example of the control circuit for controlling the movable unit 28 to move at a constant velocity in accordance with the pulses delivered from the photoelectric pick-up device 66 in the arrangement of FIGS. 1 and 2 or FIG. 3 and 4 or the photoelectric pick-up device 66' in the arrangement of FIG. 11.

Referring to FIG. 12, the pulses delivered from the photoelectric pick-up device 66 (or 66') and shaped by the waveshaper 80 are converted into a corresponding analog signal such as a voltage variable with the frequency of the input pulses by means of a frequency-voltage converter 120. The output voltage from the frequency-voltage converter 120 is fed to one input terminal of a two-input comparator circuit 122 which is constantly supplied with a fixed reference voltage from a reference voltage source 124 connected to the other input terminal of the comparator circuit 122. The reference voltage supplied to the comparator circuit 122 is representative of a predetermined frequency of the pulses delivered from the photoelectric pick-up device 66 (or 66'). The comparator circuit 122 is thus operative to compare the output voltage from the frequency-voltage converter 120 with such a reference voltage and delivers an output signal representative of the difference between the frequency of the pulses from the pick-up device 66 (or 66') and the predetermined frequency. The output signal from the comparator 124 is supplied to a suitable driver circuit 126 for producing a control current in accordance with the signal supplied thereto. The control current produced by the driver circuit 126 is fed to the control coils 44 and 44' forming part of the armatures in the pick-up arm drive assembly illustrated in FIGS. 1 and 2 or FIGS. 3 and 4 or the coil incorporated in the rotary motor 108 in the pick-up arm drive assembly illustrated in FIG. 11. The frequency of the pulses produced by the photoelectric pick-up device 66 (or 66') being proportional or otherwise variable with the velocity of movement of the movable unit 28, the movable unit 28 and accordingly the pick-up arm 50 can be driven to move at a constant velocity by the control circuit current thus supplied from the driver circuit 126 as will be readily understood.

What is claimed is:

1. A linear-tracking pick-up arm drive assembly for a disc player, comprising at least one elongate stationary guide member, a movable unit having a pick-up arm supported thereon and longitudinally movable on and along said guide member, the pick-up arm being movable with said movable unit to and from a predetermined reference position, electrically operated drive means operative to drive said movable unit on and along said guide member, a rotary disc rotatable with the longitudinal movement of said movable unit, distance detecting means responsive to the rotational movement of said rotary disc and operative to produce a train of pulses representative of the distance of the pick-up arm moved from said reference position thereof, and a control circuit responsive to the pulses from said distance detecting means for energizing said drive means in accordance with the pulses from the distance detecting means, said control circuit comprising (A) a memory circuit operative to have stored therein a set of pulses representative of a predetermined distance of the pick-up arm from said reference position thereof, (B) a presettable forward-backward counter having a presetting terminal and an input terminal which is connected to said distance detecting means, the forward backward counter being operative to forwardly and backwardly count the pulses from said distance detecting means when said pick-up arm is being moved away from or toward said reference position thereof, (C) a subtractor connected between said memory circuit and said forward-backward counter and operative to produce a differential signal representative of the difference between the number of the pulses from the memory circuit and the number of the pulses from the forward-backward counter, (D) a control signal generator having an input terminal connected to said substractor for converting said differential signal into a control signal for said drive means, and (D) signal correcting means responsive to predetermined transitive positions of the pick-up arm with respect to said reference position thereof and connected to the presetting terminal of said forward-backward counter, said signal correcting means being operative to produce pulses corresponding in number to each of said predetermined transitive positions of the pick-up arm and to preset the forward-backward counter when the pick-up arm is moved into each of said transitive positions, said signal correcting means comprising an arm position detector operative to produce pulses representative of said transitive positions of the pick-up arm, gate circuits having respective trigger terminals responsive to the pulses representative of said transitive positions, respectively, the gate circuits having respective output terminals jointly connected to the presetting terminal of said forward-backward counter; and memory circuits having respective output terminals respectively connected to the input terminals of said gate circuits, the memory circuits being operative to have stored therein signals which are respectively representative of the distances between said reference position and said transitive positions of the pick-up arm.

2. A linear-tracking pick-up arm drive assembly for a disc player, comprising at least one elongate stationary guide member, a movable unit having a pick-up arm supported thereon and longitudinally movable on and along said guide member, the pick-up arm being movable with said movable unit to and from a predetermined reference position, electrically operated drive means operative to drive said movable unit on and along said guide member, a rotary disc rotatable with the longitudinal movement of said movable unit, distance detecting means responsive to the rotational movement of said rotary disc and operative to produce a train of pulses representative of the distance of the pick-up arm moved from said reference position thereof, and a control circuit responsive to the pulses from said distance detecting means for energizing said drive means in accordance with the pulses from the distance detecting means, said control circuit comprising (A) a memory circuit operative to have stored therein a set of pulses representative of a predetermined distance of the pick-up arm from said reference position thereof, (B) a presettable forward-backward counter having a presetting terminal and an input terminal which is connected to said distance detecting means, the forward-backward counter being operative to forwardly or backwardly count the pulses from said distance detecting means when said pick-up arm is being moved away from or toward said reference position thereof, (C) a subtractor connected between said memory circuit and said forward-backward counter and operative to produce a differential signal representative of the difference between the number of the pulses from the memory circuit and the number of the pulses from the forward-backward counter, (D) a control signal generator having an input terminal connected to said substractor for converting said differential signal into a control signal for said drive means, and (E) signal correcting means responsive to predetermined transitive positions of the pick-up arm with respect to said reference position thereof and connected to the presetting terminal of said forward-backward counter, said signal correcting means being operative to produce pulses corresponding in number to each of said predetermined transitive positions of the pick-up arm and to preset the forward-backward counter when the pick-up arm is moved into each of said transitive positions, said signal correcting means comprising an arm position detector operative to detect the intermission zones of a grooved surface of a recording disc set in the disc player and produce pulses representative of said transitive positions of the pick-up arm with respect to the intermission zones, a binary counter operative to successively produce output signals in response to the pulses from said arm position detector, and memory circuits having respective input terminals jointly connected to the output terminal of said forward-backward counter and respective output terminals jointly connected to said presetting terminal of the forward-backward counter, the memory circuits being operative to have the output signals from said forward-backward counter respectively stored therein during one playing operation with said recording disc and to release the output signals to said presetting terminal of said forward-backward counter during a subsequent playing operation with said recording disc.

3. A linear-tracking pick-up arm drive assembly as defined in claim 2, in which said control circuit further comprises a flip-flop circuit having set and reset input terminals and uninverted and inverted output terminals corresponding to the set reset input terminals, respectively, a first set of logic AND-gate circuits having respective first input terminals respectively responsive to the output signals from said binary counter and respective second input terminals jointly connected to said uninverted output terminal of said flip-flop circuit, a second set of logic AND-gate circuits having respective first input terminals respectively responsive to the output signals from said binary counter and respective second input terminals jointly connected to said inverted output terminal of said flip-flop circuit, a first set of signal gate circuits having respective input terminals jointly connected to the output terminal of said foeard-backward counter and respective output terminals respectively connected to the input terminals of said memory circuits, and a second set of signal gate circuits having respective input terminals connected to the output terminals of said memory circuits, respectively, and respective output terminals jointly connected to the presetting terminal of said forward-backward counter, the first set signal gate circuits further having respective trigger terminals connected to the output terminals of said first set AND-gate circuits, respectively, and the second set signal gate circuits further having respective trigger terminals connected to the output terminals of said second set AND-gate circuits, respectively.

4. A linear-tracking pick-up arm assembly as defined in claim 2, in which said arm position detector comprises a light-sensitive photoelectric transducer element responsive to the difference between the coefficients of reflection at the grooved playing zones and the plain intermission zones of a grooved surface of said recording disc, and a light-emissive element operative to irradiate the grooved surface of the recording disc at an angle at which the light reflected at the grooved surface is incident on said transducer element.

5. A linear-tracking pick-up arm drive assembly for a disc player, comprising at least one elongate stationary guide member, a movable unit having a pick-up arm supported thereon and longitudinally movable on and along said guide member, the pick-up arm being movable with said movable unit to and from a predetermined reference position, electrically operated drive means operative to drive said movable unit on and along said guide member, a rotary disc rotatable with the longitudinal movement of said movable unit, distance detecting means responsive to the rotational movement of said rotary disc and operative to produce a train of pulses representative of the distance of the pick-up arm moved from said reference position thereof, and a control circuit responsive to the pulses from said distance detecting means for energizing said drive means in accordance with the pulses from the distance detecting means, said control circuit comprising (A) a memory circuit operative to have stored therein a set of pulses representative of a predetermined distance of the pick-up arm from said reference position thereof, (B) a presettable forward-backward counter having a presetting terminal and an input terminal which is connected to said distance detecting means, the forward-backward counter being operative to forwardly or backwardly count the pulses from said distance detecting means when said pick-up arm is being moved away from or toward said reference position thereof, (C) a subtractor connected between said memory circuit and said forward-backward counter and operative to produce a differential signal representative of the difference between the number of the pulses from the memory circuit and the number of the pulses from the forward-backward counter, (D) a control signal generator having an input terminal connected to said subtractor for converting said differential signal into a control signal for said drive means, and (E) signal correcting means responsive to predetermined transitive positions of the pick-up arm with respect to said reference position thereof and connected to the presetting terminal of said forward-backward counter, said signal correcting means being operative to produce pulses corresponding in number to each of said predetermined transitive positions of the pick-up arm and to preset the forward-backward counter when the pick-up arm is moved into each of said transitive positions, said distance detecting means being operative to produce a train of pulses with a frequency variable with the velocity of movement of said movable unit on said guide member and in which said control circuit comprises converting means for producing an analog signal variable with the frequency of the pulses from said position detecting means, and comparing means for comparing said analog signal with a reference signal representative of a predetermined frequency of said pulses and producing an output signal representative of the difference between the frequency of said pulses and predetermined frequency, said drive means being energized in accordance with the output signal from said comparing means.

* * * * *